United States Patent [19]

Brand

[11] 4,289,409
[45] Sep. 15, 1981

[54] APPARATUS FOR PLASTICIZING AND EXTRUDING PLASTIC MATERIAL

[75] Inventor: Wilhelm Brand, Hanover, Fed. Rep. of Germany

[73] Assignee: Hermann Berstorff Maschinenbau GmbH, Hanover, Fed. Rep. of Germany

[21] Appl. No.: 121,162

[22] Filed: Feb. 13, 1980

[30] Foreign Application Priority Data

Feb. 19, 1979 [DE] Fed. Rep. of Germany ....... 2906324

[51] Int. Cl.³ .............................................. B29B 1/10
[52] U.S. Cl. ...................................... 366/83; 198/666
[58] Field of Search .................... 366/75, 76, 77, 287, 366/288, 78, 79, 80, 81, 82, 83, 87, 88, 89, 90, 318, 319, 320, 321, 322, 323; 198/666, 674, 675; 425/207, 208; 100/145; 415/66–74

[56] References Cited

U.S. PATENT DOCUMENTS

| 2,785,438 | 3/1957 | Willert | 366/81 |
| 3,310,837 | 3/1967 | Wittrock | 366/76 |
| 3,825,236 | 7/1974 | Hussmann | 366/89 |
| 4,176,967 | 12/1979 | Brinkmann | 425/207 |
| 4,192,617 | 3/1980 | Spielhoff | 425/207 |

*Primary Examiner*—Robert W. Jenkins
*Attorney, Agent, or Firm*—Schwartz, Jeffery, Schwaab, Mack, Blumenthal & Koch

[57] ABSTRACT

Multi-stage apparatus for plasticizing and extruding plastic material comprising a first extruder having a first screw, a planetary roller unit and a second extruder having a second screw, the second screw receiving its drive from the first screw via the planetary roller whereby a speed increase or reduction is obtainable between the two extruder screws depending upon the particular arrangement and tooth ratio of the planetary roller unit.

6 Claims, 8 Drawing Figures

APPARATUS FOR PLASTICIZING AND EXTRUDING PLASTIC MATERIAL

The invention relates to apparatus for plasticising and extruding plastic material and particularly though not exclusively synthetic thermo-plastics material.

In such processing of synthetic thermo-plastics materials it has in some cases proved advantageous to use multi-stage extruders. Screw extruders in a cascade arrangement have been found to be particularly advantageous, since the material can be handled gently with them. This results from the possibility of operating the screws of each stage in the cascade at different rotary speeds. This independent setting of the rotary speed from one stage to another enables the steps in the extrusion process to be separated. For example, the steps of supplying the raw material, conveying, compressing, fusing and pre-homogenising it may be effected by the first stage in the cascade. The steps of compressing the material, tempering, mixing, filtering and extruding it may be effected by the second stage. The screw of the second stage in the cascade, which can be cooled, is generally required to be operated at a lower rotary speed and with a larger screw diameter compared with the first stage, in order to avoid further heating of the material being processed, which would be harmful and unnecessary.

When plastics materials capable of foaming have been processed and extruded in cascade extruders, the steps of conveying and fusing them and blending in the injected propellant have in the past been allotted to the first stage of the cascade. In the first stage a high enough temperature had to be created to prevent the gaseous propellant from foaming the plastics melt in the apparatus. The second stage of the cascade was devoted to homogenising gently the foamable plastics melt and intensively cooling it, to prevent the temperature of the melt at an outlet nozzle from rising above a certain temperature.

The transition from the first stage to the second stage of the cascade has been found extremely difficult to seal off, since the foamable plastics melt has to be kept at a high pressure. The high pressure resulted in considerable wastage of the gaseous propellant blended in. Such wastage was an economic disadvantage and at the same time was unsafe in cases where explosive propellants were used. There was also a risk of the cell structure of the plastics foam becoming uneven, should the gaseous propellant escape unevenly.

In addition, previously proposed cascade-type extruder arrangements involve a heavy industrial outlay, in that each processing stage requires separate drive means or an extremely complex gearing construction to obtain its drive from the same drive means at the other stage or stages of the cascade.

The invention has among its objects to provide multi-stage apparatus for plasticising and extruding plastic materials, which will enable a speed of rotation different to an intake stage to be imparted to a discharge stage, without expensive connections and seals being required between the processing stages. In addition, the industrial outlay in respect of the driving arrangements can be reduced.

According to the invention, there is provided multi-stage apparatus for plasticising and extruding plastics materials, wherein one of the stages includes and drives or is driven by a planetary roller unit, and the planetary roller unit is so coupled to a rotatable working member of another of the stages that there is an increase or a reduction in the speed of rotation between said rotatable working member and a rotatable working member of said one of the stages, dependent on the tooth ratio of the planetary roller unit.

The invention thus makes use of the speed increase or reduction between the components of planetary roller units, known per se, as plasticising and blending members. Such units comprise an obliquely toothed main spindle with a plurality of similarly toothed planet spindles located around its periphery, the planet spindles meshing also with an internally toothed cylinder portion arranged concentrically with the main spindle. By varying the coupling of rotatable parts of the planetary roller unit to the working members of the other processing stages, such as extruder screws, increased or reduced speed of rotation can easily be obtained in the processing stages preceding or succeeding the planetary roller units. Increase or reduction in the speed of rotation is chosen depending on the application and the properties of the material to be processed.

In one embodiment for a two stage apparatus, the rotatable working member of said one of the stages comprises a driven intake screw of an intake screw extruder, said intake screw extending from a feed aperture and being drivingly connected to a main spindle of the planetary roller unit, planetary spindles surrounding and orbiting around said main spindle are mounted in a planetary spindle cage at the downstream end of the planetary roller unit, and the cage is secured against rotation with respect to an adjoining discharge screw of a discharge screw extruder, which adjoining discharge screw forms said rotatable working member of said another of the stages.

The intake screw draws in the material, conveys it, plasticises it and builds up a pressure. The planetary roller unit acts as a blender. In transmitting the rotary motion the planetary roller unit acts as a planetary gearing and thus the rotary speed of the discharge screw connected to the cage is lower than that of the intake screw. The discharge screw thereby has a lower peripheral speed, which means that it also has a less marked shearing action. An inadmissible rise in the temperature of the already plasticised and blended material can then be avoided.

The discharge screw may be given a larger diameter than the intake screw, in order to give a larger cooling area for the material being discharged. This embodiment is particularly suitable for the production of plastics foam. The special requirement in extruding foamable plastics materials, namely that the materials at the outlet from the nozzle must be cooled to a certain temperature, can be satisfactorily fulfilled. The planetary roller unit constitutes a fast moving plasticising member, which is followed by a slow moving, cooling discharge screw. Although peripheral speed increases with an increase in screw diameter, the material can be cooled more intensively when there is a large periphery.

In another embodiment, the rotatable working member of said one of the stages comprises a driven intake screw of an intake screw extruder, said intake screw extruder extending from a feed aperture and being drivingly connected to a main spindle of the planetary roller unit, rotatable planetary spindles surrounding the main spindle are prevented from orbiting by retaining means and the planetary spindles are meshed on the one hand with external teeth of said main spindle and on the other hand with internal teeth of a cup-shaped extension of a discharge screw adjoining the planetary roller unit, which discharge screw forms said rotatable working member of said another of the stages.

By securing the planetary spindles against orbiting and engaging them with the internally toothed, cup-shaped extension of the discharge screw, a reduction in speed is again obtained for the discharge screw.

In a further embodiment, the rotatable working member of said one of the stages comprises a driven intake screw of an intake screw extruder, said intake screw extruder extending from a feed aperture and being drivingly connected to a main spindle of the planetary roller unit, planetary spindles surrounding and orbiting around the main spindle mesh with internal teeth in a cylinder portion surrounding them, the planetary spindles each have an elongating extension projecting beyond the internal toothed cylinder portion, the number of teeth on the elongating extensions is different to the number of teeth on the planetary spindesl, and the elongating extensions of the planetary spindles mesh with an internally toothed, cup-shaped extension secured to an adjoining discharge screw, which discharge screw forms said rotatable working member of said another of the stages.

In a still further embodiment said rotatable working member of said another of the stages comprises a driven intake screw which transmits its rotating motion to the planetary roller unit of said one of the stages by being coupled with planetary spindles of the planetary roller unit, and a main spindle of the planetary roller unit is directly connected to a discharge screw forming the rotatable working member of said one of said stages.

This embodiment has proved particularly successful in processing powdered rubber. In the intake stage the moulding material is drawn in by the relatively slow moving intake screw and fed to the succeeding planetary roller unit, the main spindle of which has a higher rotary speed than the intake screw.

The driven intake screw is preferably connected to a planetary spindle cage, by which the rotating motion is transmitted to the rotating and revolving planetary spindles. In this way the main spindle of the planetary roller unit is driven so that the discharge screw necessarily rotates at a higher speed than the intake screw.

The invention is diagrammatically illustrated by way of example with reference to the accompanying drawings, in which.

Figure 1:
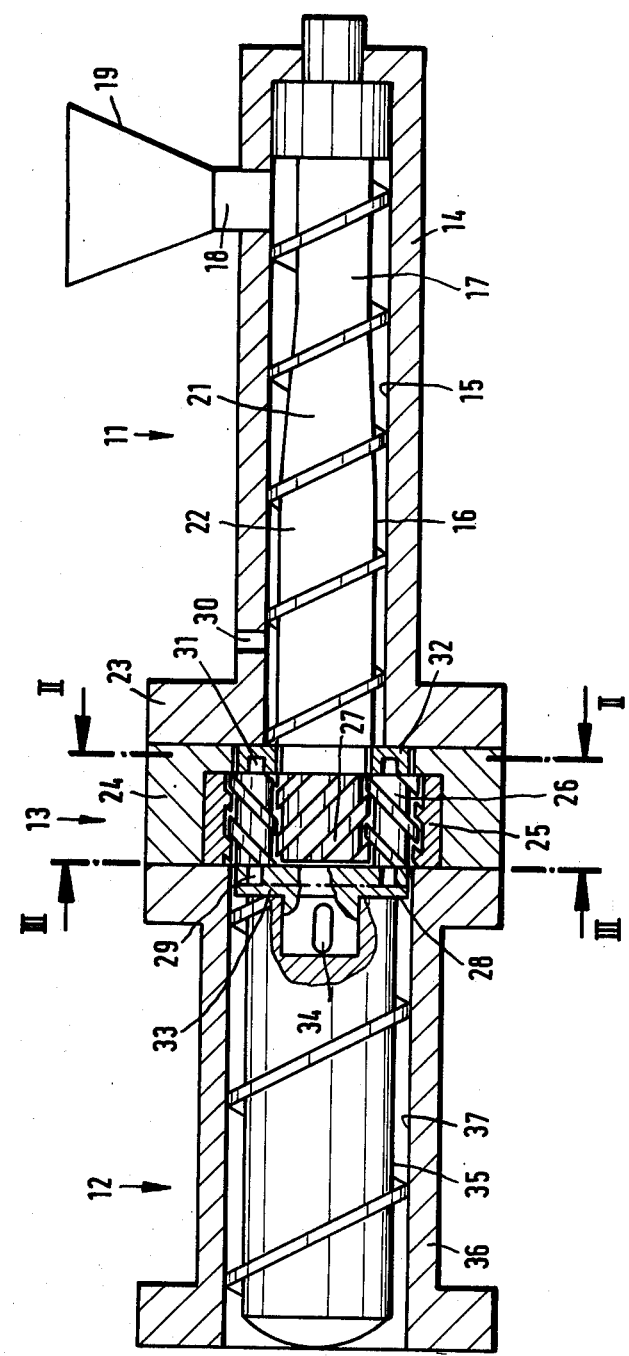
FIG. 1 shows a first embodiment of the invention in the form of a two-stage plasticising apparatus with a planetary roller unit in a first processing stage.
Figure 2:
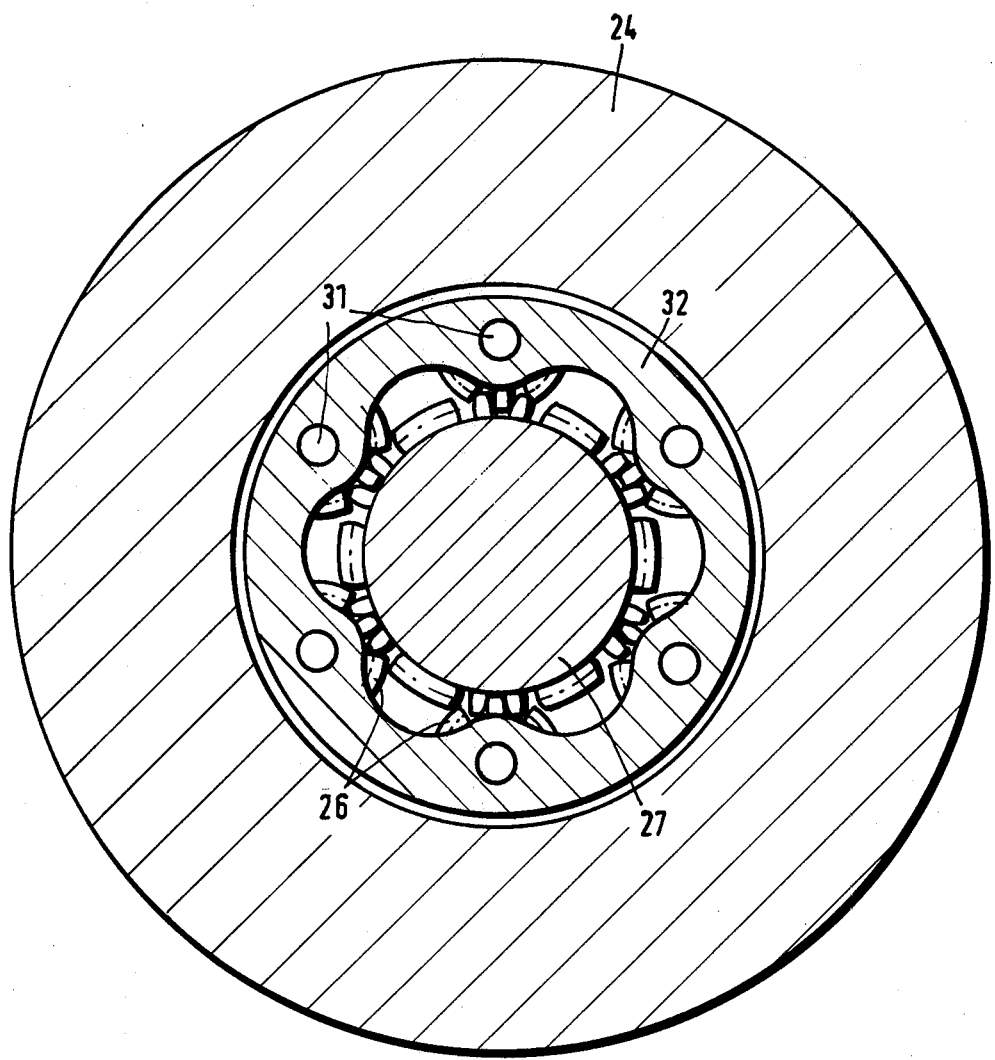
FIG. 2 is a cross-section taken on line II—II of FIG. 1.
Figure 3:
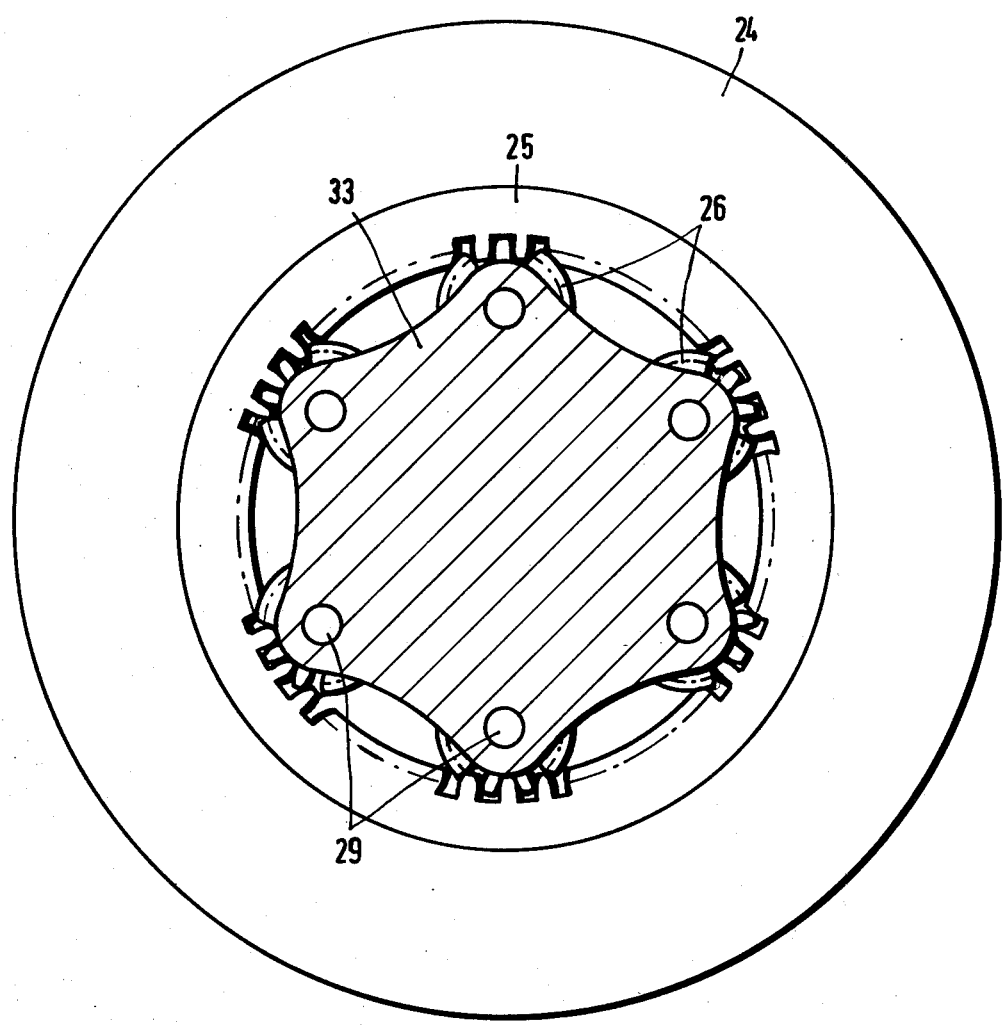
FIG. 3 is an offset cross-section taken on line III—III of FIG. 1.

Referring to the drawings, the two-stage plasticising apparatus shown in FIGS. 1 to 3 substantially comprises an intake screw extruder 11, a discharge screw extruder 12 and a planetary roller unit 13 disposed between the two extruders 11 and 12. The upstream intake screw extruder 11 has a screw cylinder 14 with a cylindrical bore 15. An intake screw 16 is disposed rotatably in the bore 15 and has its thread cut deep at the beginning and thus forms a drawing-in zone 17 beneath a feed aperture 18 in the screw cylinder 14. A feed hopper 19 for the moulding material to be processed is disposed over the feed aperture 18. After the drawing-in zone 17, the core diameter of the intake screw 16 increases continuously to form a compressing zone 21, which adjoins a pressure-creating zone 22 where the core diameter of the screw is constant. In the pressure-creating zone 22 the screw cylinder 14 has an injection aperture 30 through which a gaseous propellant can be injected. At its downstream end the cylinder 14 has a flange 33 connecting the intake screw extruder 11 to the housing 24 of the planetary roller unit 13. The housing 24 has a stationary, internally toothed sleeve 25 which meshes with the outer faces of planetary spindles 26; on their inner sides the spindles 26 engage in external teeth on a main spindle 27. The main spindle 27 is secured against rotation with respect to the intake screw 16. The planetary spindles 26 surround the main spindle 27 and orbit around it. They are arranged rotatably on shafts 28 which project beyond their screwed portions. The projecting ends 29, 31 of the shafts 28 are engaged in respective cages 32 and 33 (FIG. 2 and FIG. 3).

The first planetary spindle cage 32 (FIG. 2) at the inlet end of the unit 13 is of annular form with its internal contour undulating, in order to allow the material conveyed and plasticised by the intake screw 16 to pass through and enter the planetary roller unit 13. The wave troughs which are formed between the supported ends 31 of the shafts provide an opportunity for the material conveyed into the planetary roller unit 13 to pass through.

The planetary spindle cage 33 at the outlet end of the unit 13 (FIG. 3) has a different configuration being in the form of a disc with recesses between the bearings for the ends 29 of the shafts of the spindles 26. The material processed in the unit 13 can pass through the recesses.

The downstream planetary spindle cage 33 is non-rotatably joined to a discharge screw 35 of the extruder 12 by a splined shaft connection 34. The extruder 12 has a cylinder 36, the cylindrical bore 37 thereof being of larger diameter than the bore 15 of the cylinder 14 of the intake screw extruder 11.

The intake screw 16 is driven by a motor (not shown) and as mentioned above is secured against rotation with respect to the main spindle 27 of the unit 13. The motor thus drives the main spindle 27 at the same speed as the intake screw 16. The extruder 11 and the unit 13 together form a first processing stage. The rotating and revolving planetary spindles 26 transmit the rotary motion to the downstream planetary spindle cage 33 with a reduction determined by the teeth ratio. The speed of rotation of the discharge screw 35 is therefore reduced compared with the intake screw 16.

Figure 4:
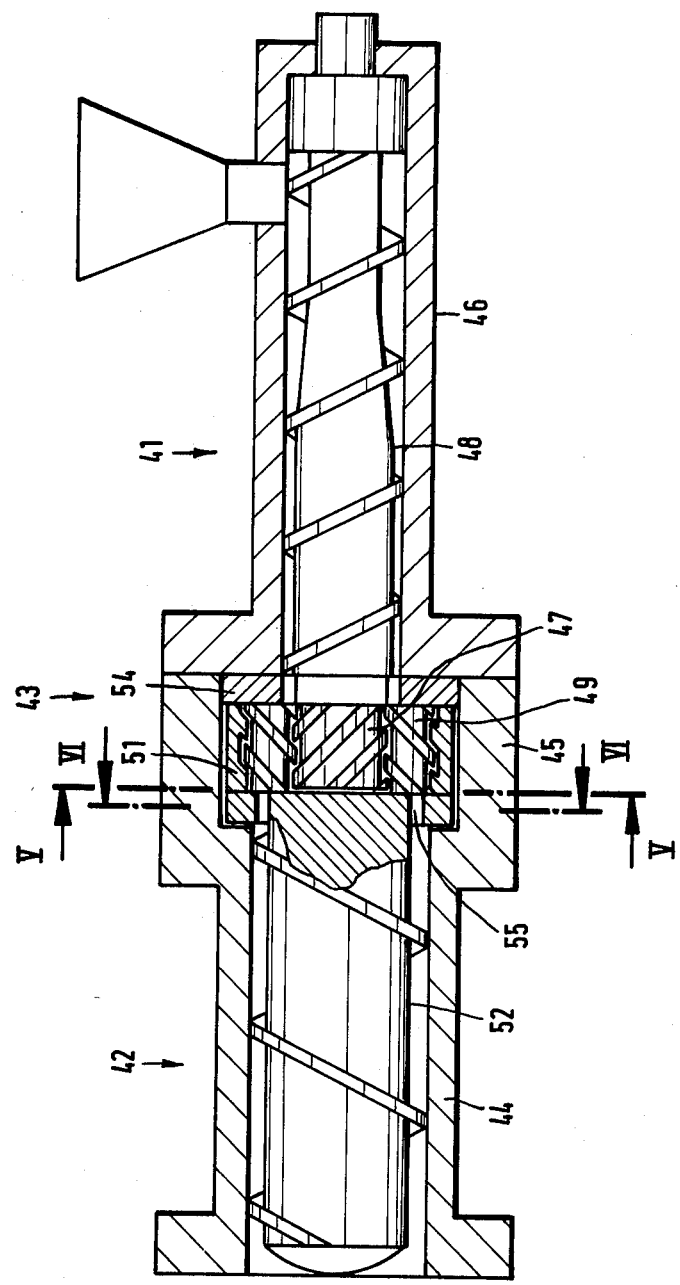
FIG. 4 shows a second embodiment of the invention in the form of a two-stage apparatus, where the rotary motion is transmitted via fixed planetary spindles to an internally toothed, cup-shaped extension of a discharge screw.
Figure 5:
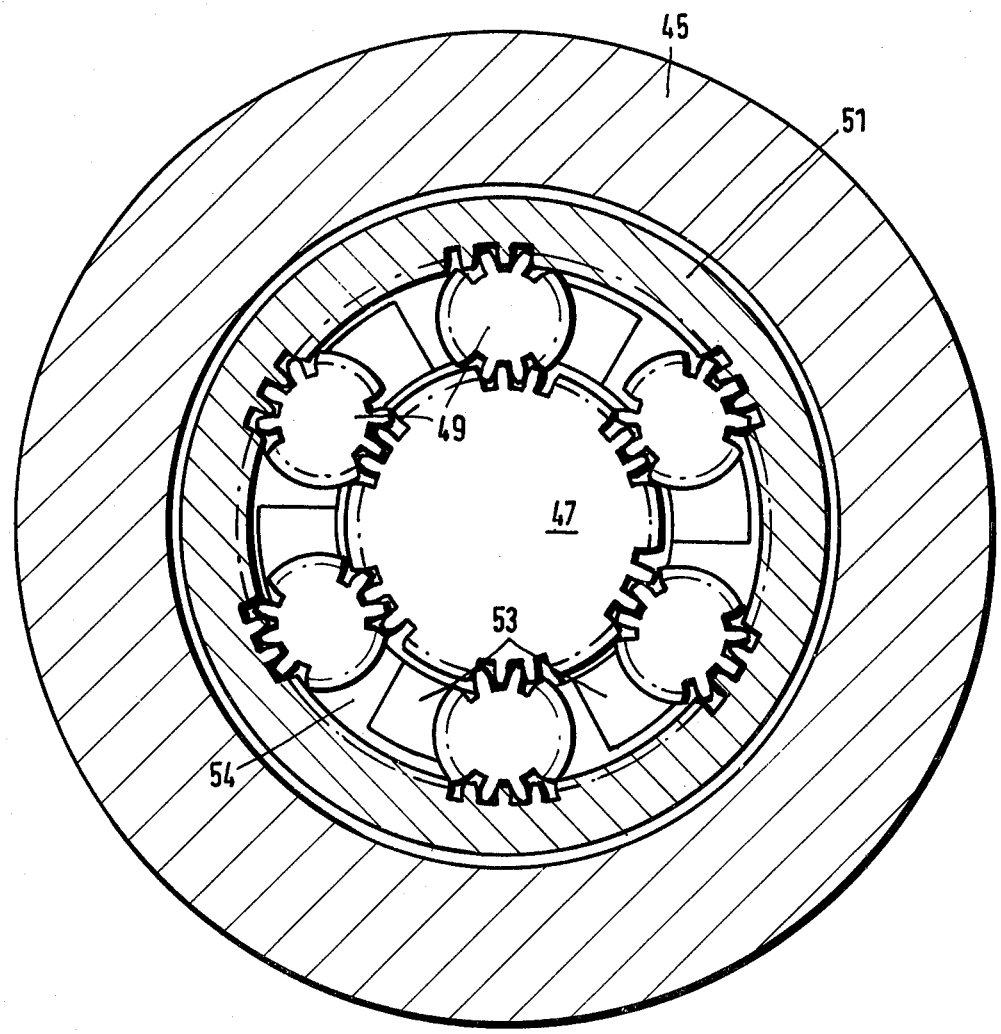
FIG. 5 is a cross-section taken on line V—V of FIG. 4.
Figure 6:
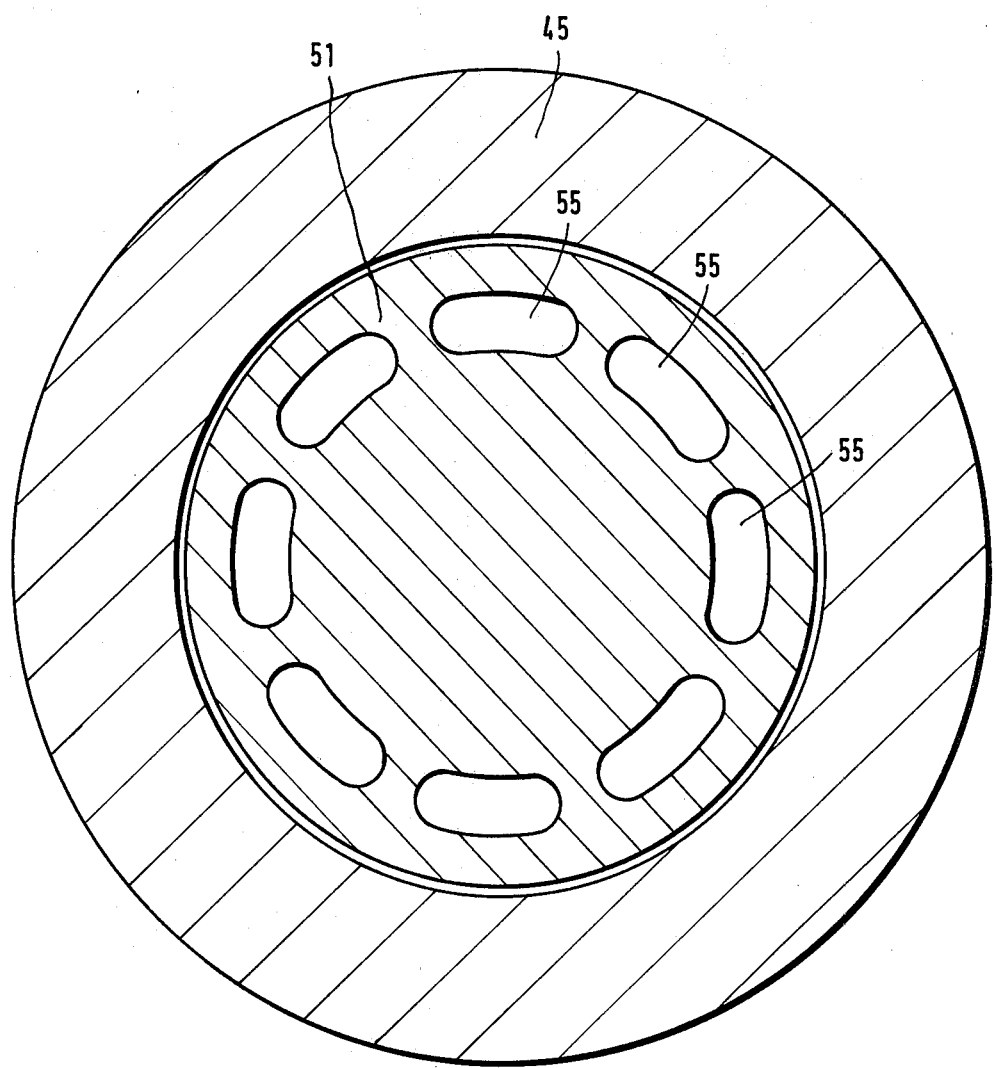
FIG. 6 is a cross-section taken on line VI—VI of FIG. 4.

The embodiment shown in FIGS. 4 to 6 similarly has an intake screw extruder 41 and a discharge screw extruder 42 with a planetary roller unit 43 disposed between them. The extruder 41 and unit 43 form a first processing stage, while the discharge screw extruder 42 forms a second stage, which operates at a speed of rotation different to the first stage. The extruder 41 is of the same construction as that shown in FIG. 1. The cylinder 44 of the discharge extruder 42 has an integral extension 45 with an enlarged internal diameter at the end facing towards the unit 43. This stepped extension 45 forms the housing for the planetary roller unit 43 and is connected directly to the cylinder 46 of the intake extruder 41. The main spindle 47 of the roller unit 43 is secured against rotation with respect to the intake screw 48. It is surrounded by planetary spindles 49 which mesh on the one hand with the external teeth on the main spindle 47 and on the other hand with internal teeth in a cup-shaped extension 51 of the discharge screw 52. The cup-shaped, internally toothed extension 51 is secured against rotation with respect to the discharge screw 52 and disposed at a clearance from the surrounding extension 45 of the cylinder 44. The planetary spindles 49 are prevented from making any revolving movement by stationary butting members 53 (FIG. 5). The butting members 53 are fixed onto an annular plate 54 arranged stationary in the cylinder chamber.

The compressed and plasticised material drawn in by the intake screw 48 is conveyed into the planetary roller stage 43. The intake screw 48 and the main spindle 47 of the unit 43 rotate at the same speed. The planetary spindles 49, which mesh with the main spindle 47, are set in rotation, run up against the butting members 53 and can thus not orbit around the main spindle 47. Consequently the internally toothed, cup-shaped extension 51 of the discharge screw 52 and thus the screw 52 itself are set in rotation. The diameter of the discharge screw 52 may be larger than that of the intake screw 46, since the intake speed of rotation is reduced by the planetary teeth.

Apertures 55 (FIG. 6) are provided at the place where the cup-shaped, internally toothed extension 51 merges into the discharge screw 52, in order to allow the material processed in the unit 43 to enter the discharge screw extruder 42.

Figure 7:
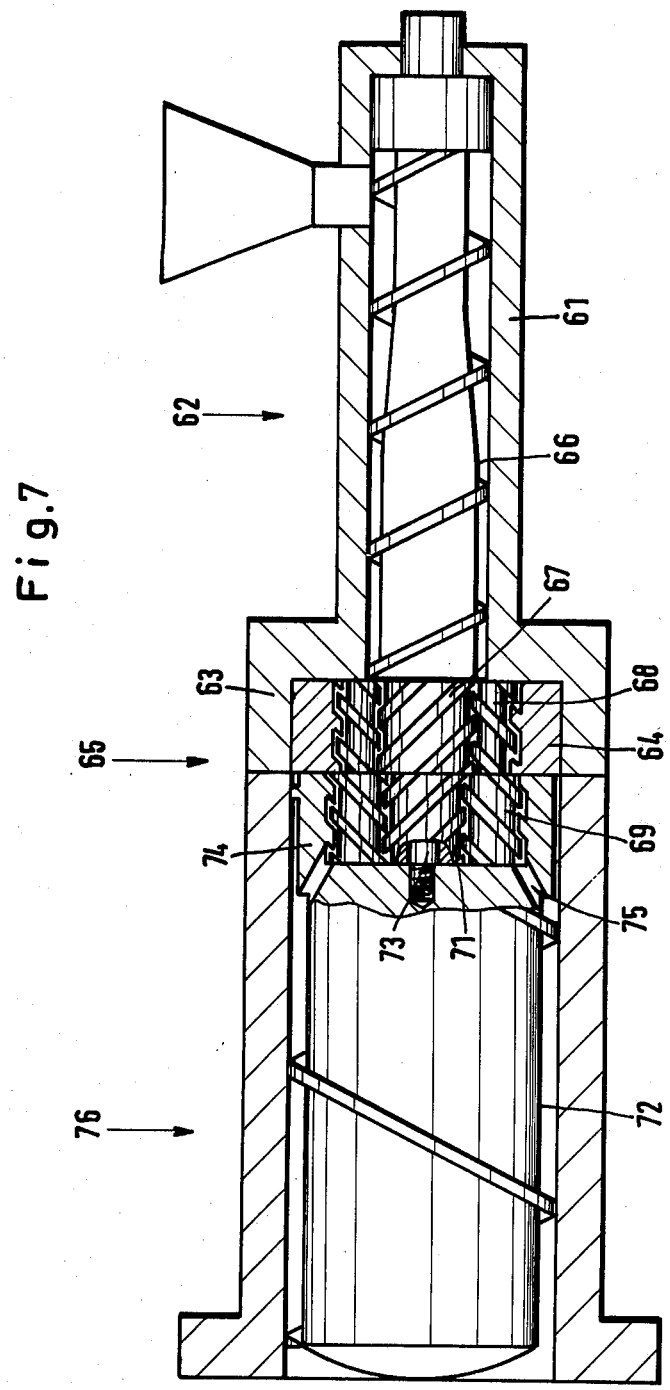
FIG. 7 shows a third embodiment of the invention in the form of a two-stage apparatus, in which the planetary spindles on an elongating extension have a different number of teeth.

The embodiment of FIG. 7 again gives a reduction in speed of rotation from the first to the second processing stage. The cylinder portion 61 of an intake screw extruder 62 has a cup-shaped extension 63 at its downstream end. An internally toothed sleeve 64 of a planetary roller unit 65 is disposed non-rotatably in the extension 63. The intake screw 66 is again secured against rotation with respect to the main spindle 67 of the planetary roller unit 65. The planetary spindles 68 mesh with the teeth on the main spindle 67 and with the internally toothed sleeve 64 and orbit around the main spindle 67. The planetary spindles 68 each have an integral spindle portion 69, extending beyond the region of the internally toothed sleeve 64. The spindle portions 69 have a larger diameter than the planetary spindles 68. They are supported by a central spindle portion 71 disposed centrally between the spindle portions 69. The central spindle portion 71 is guided rotatably on a pin 73 screwed into the discharge screw 72. The discharge screw 72 has a cup-shaped, internally toothed extension 74, which surrounds and meshes with the larger spindle portions 69. Adjacent the root of the cup-shaped extension 74 apertures 75 are provided to give the plasticised material passage into the discharge extruder 76.

The planetary roller unit 65 is driven by the main spindle 67, which is non-rotatably joined to the intake screw 66. The planetary spindles 68 rotate and simultaneously orbit around the main spindle 67. In the course of this circling movement the larger spindle portions 69 transmit the rotating motion to the internally toothed, cup-shaped extension 74 of the discharge screw 72. On the basis of the teeth selected in this example the screw 72 turns with a lower speed of rotation than the intake screw 76.

Figure 8:
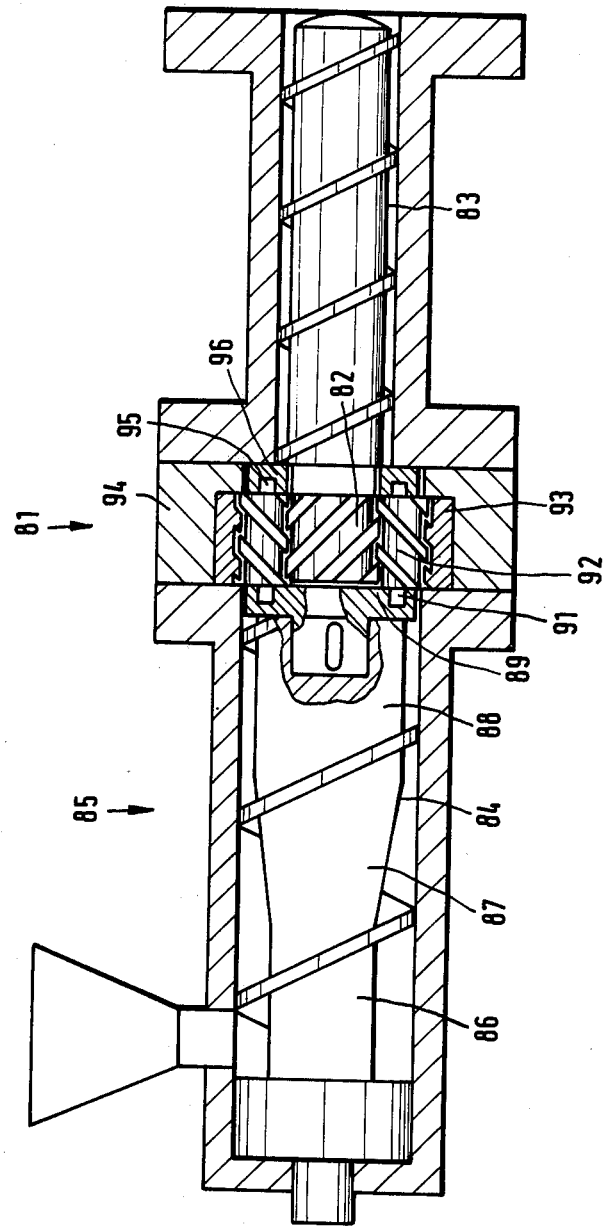
FIG. 8 shows a fourth embodiment of the invention in the form of a two-stage apparatus with a planetary roller unit, the planetary roller unit being disposed in the second processing stage.

The two-stage apparatus for processing moulding materials, shown in FIG. 8, has the planetary roller unit 81 in the second processing stage. This means that a main spindle 82 of the unit 81 is driven at the same speed of rotation as a discharge screw 83 of the second processing stage.

An intake screw 84 of an intake extruder 85 has a drawing-in zone 86, a compressing zone 87 and a pressure-creating zone 88. At the downstream end of the intake screw 84 a planetary spindle cage 89 is provided and is secured against rotation with respect to the intake screw 84. The configuration of the cage 89 is like that shown in FIG. 3. The cage 89 is used to hold the ends 91 of shafts on which planetary spindles 92 are mounted rotatably. The planetary splindes 92 engage on the one hand with internal teeth in a sleeve 93, disposed stationary in a housing 94 of the planetary roller unit 81, and on the other hand with external teeth on the main spindle 82, which is secured against rotation with respect to the discharge screw 83. The downstream ends 95 of the shafts for mounting the planetary spindles 92 are held in a cage 96, similar in construction to the cage shown in FIG. 2. The only function of the cage 96 is to improve the guidance of the planetary spindles 92 and prevent them from canting.

The intake screw 84 revolves relatively slowly and draws in the material, e.g. powered rubber. Following compression and the build-up of pressure in the material, the material is conveyed into the planetary roller unit 81. The rotating movement of the intake screw 84 is transmitted by the planetary spindles 92 to the main spindle 82 and thereby to the discharge screw 83 which is secured to the main spindle 82. The speed of rotation is stepped up so that the discharge screw 83 has a higher speed of rotation than the intake screw 84.

What is claimed is:

1. Multi-stage apparatus for plasticising and extruding plastic materials comprising a first stage and a second stage, a respective rotatable working member for each of said stages, a planetary roller unit having a main spindle and a plurality of planetary spindles, said planetary roller unit being included in said first stage and so drivingly connected to said rotatable working member of said first stage and said rotatable working member of said second stage, that there is an increase or a reduction in the speed of rotation between said rotatable working member of said first stage and said rotatable working member of said second stage, dependent on the tooth ratio of said planetary roller unit.

2. Multi-stage apparatus as claimed in claim 1, wherein said rotatable working member of said first stage comprises a driven intake screw of an intake screw extruder, said intake screw extends from a feed aperture and is drivingly connected to said main spindle of said planetary roller unit, said planetary spindles surround and can orbit around said main spindle and are mounted in a planetary spindle cage at the downstream end of said planetary roller unit, and said cage is secured against rotation with respect to an adjoining discharge screw of a discharge screw extruder, which said adjoining discharge screw forms said rotatable working member of said second stage.

3. Multi-stage apparatus as claimed in claim 1, wherein said rotatable working member of said first stage comprises a driven intake screw of an intake screw extruder, said intake screw extruder extends from a feed aperture and is drivingly connected to said main spindle of said planetary roller unit, said planetary spindles surround said main spindle are rotatable, are prevented from orbiting by retaining means and are meshed with said main spindle and with internal teeth of a cup-shaped extension of a discharge screw adjoining said planetary roller unit, which said discharge screw forms said rotatable working member of said second stage.

4. Multi-stage apparatus as claimed in claim 1, wherein said rotatable working member of said first stage comprises a driven intake screw of an intake screw extruder, said intake screw extruder extends from a feed aperture and is drivingly connected to said main spindle of said planetary roller unit, said planetary spindles surround and can orbit around the main spindle and mesh with internal teeth in a cylinder portion surrounding them, said planetary spindles each have an elongating extension projecting beyond said internally toothed cylinder portion, the number of teeth on said elongating extensions is different to the number of teeth on said planetary spindles, and said elongating extensions of said planetary spindles mesh with an internally toothed, cup-shaped extension secured to an adjoining discharge screw, which said discharge screw forms said rotatable working member of said second stage.

5. Multi-stage apparatus as claimed in claim 1, wherein said rotatable working member of said second stage comprises a driven intake screw of an intake screw extruder and transmits its rotating motion to said planetary roller unit of said first stage by being coupled with said planetary spindles of said planetary roller unit, and said main spindle of said planetary roller unit is directly connected to a discharge screw forming said rotatable working member of said first stage.

6. Multi-stage apparatus as claimed in claim 5, wherein said driven intake screw is coupled by a planetary spindle cage to said planetary spindles.

* * * * *